Jan. 13, 1931.  H. W. MORREALL  1,788,776
GAUGE GLASS ILLUMINATOR
Filed July 3, 1929
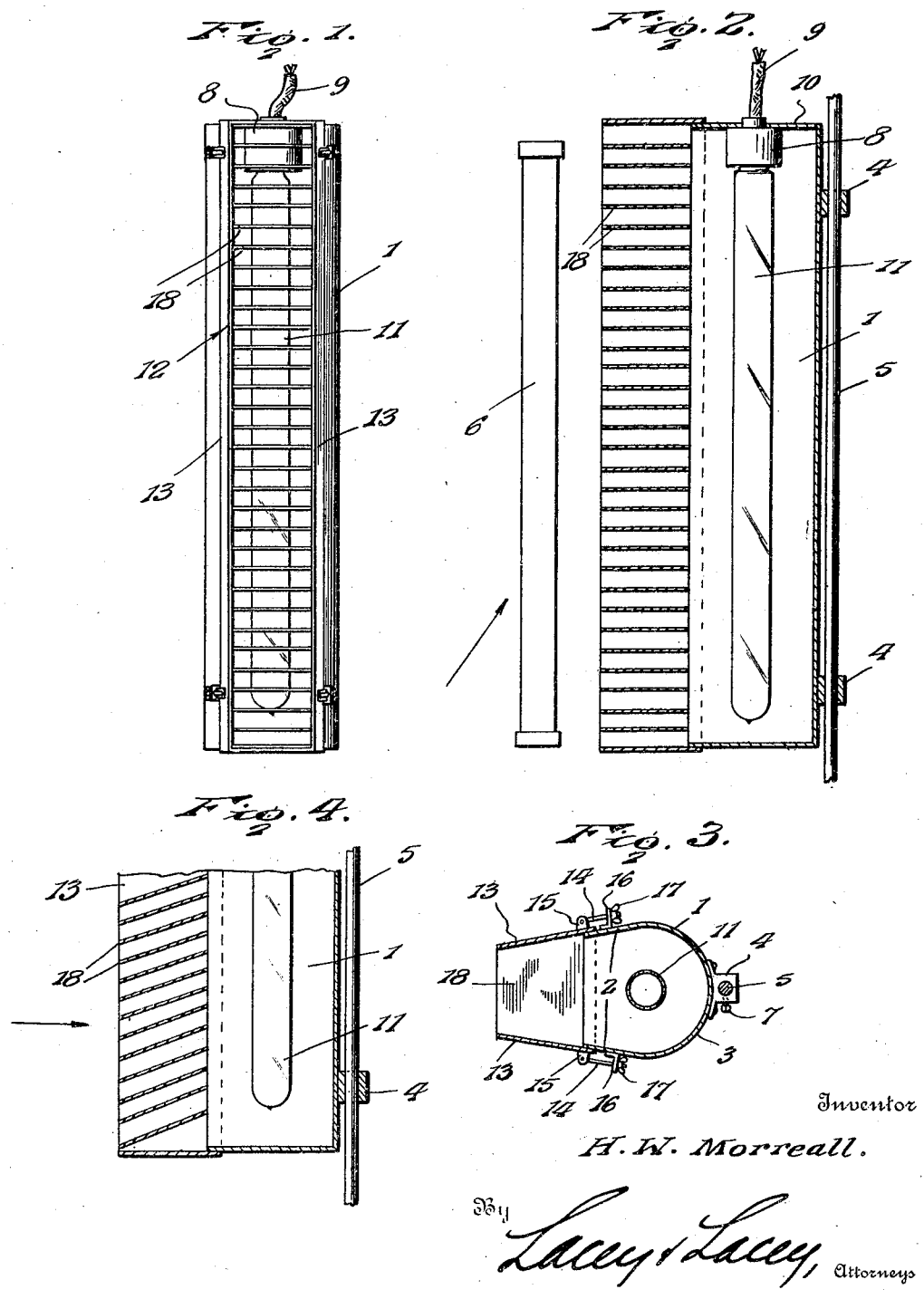

Patented Jan. 13, 1931

1,788,776

UNITED STATES PATENT OFFICE

HERBERT W. MORREALL, OF MOUNT CARMEL, PENNSYLVANIA

GAUGE-GLASS ILLUMINATOR

Application filed July 3, 1929. Serial No. 375,861.

This invention relates to illuminating devices and more particularly to a device by means of which a gauge glass of a water boiler or the like may be illuminated.

When a water or steam boiler is in operation, it is necessary to have the boiler sufficiently filled with water, and in order to allow the attendant to determine the amount of water in a boiler, there is always provided a gauge glass having communication with the interior of the boiler so that the glass will be filled to a height corresponding to the level of the water in the boiler. In many instances, the room in which the boiler is located is not properly lighted and it is very difficult to see the level of the water in the glass. The glass is, in some instances, illuminated by an electric bulb suspended or otherwise mounted near the glass but it has been found that if the bulb is not shielded the glare will prevent the attendant from determining the level of the water in the glass.

Therefore, one object of the invention is to provide an illuminating device including a bulb and a shield so constructed that it will be disposed about the bulb and while allowing ample light to reach a gauge glass prevent the operator of a boiler from looking directly at the bulb when observing the gauge.

Another object of the invention is to so form the shield that it will not only prevent the light from glaring into the eyes of an attendant but also serve to protect the bulb and prevent it from being accidentally struck and broken.

Another object of the invention is to permit a portion of the shield carrying baffles to be removed so that the baffles may be cleaned if found necessary and also allow a burned out bulb to be removed and a new one substituted.

The invention is illustrated in the accompanying drawing, wherein

Figure 1 is a view showing the improved illuminator in front elevation,

Fig. 2 is a vertical sectional view through the same showing the illuminator mounted in operative relation to a water gauge glass.

Fig. 3 is a transverse sectional view through the illuminator, and

Fig. 4 is a fragmentary vertical sectional view showing a modified construction.

This improved illuminator consists of a shield having a body portion 1 which is substantially U-shaped in cross section, as shown in Fig. 3, and is formed with side walls 2 joined by a rear wall 3. Blocks 4 extend from the rear wall of the body and are formed with alined openings to receive a supporting rod 5, although other means may be provided in order to mount the illuminator in operative relation to a water gauge glass 6 and each block carries a set screw 7 so that the illuminator may be securely fastened at the proper height for directing light upon the water gauge glass. A socket 8 to which power wires 9 are attached in the usual manner is secured to the upper wall 10 of the body portion or casing of the shield, and into this socket is screwed an electric bulb 11 which may extend longitudinally in the shield, as shown in Figs. 1 and 2, or of any other shape desired, but it is preferred to have the bulb extend longitudinally in the shield so that all portions of the water gauge glass will be well illuminated.

The casing or body 1 of the shield is open at its front so that light from the bulb may pass out of the casing and be directed upon the water gauge glass and to the front of the casing is secured a hood 12 having side walls 13 which overlap the forward edge portions of the side walls 2 of the casing and carry securing bolts 14 which are pivotally mounted, as shown at 15, and adapted to be passed through cleats 16 which project from the side walls of the casing. Winged nuts 17 are screwed upon the free ends of the bolts and when tightened engage the cleats so that the hood will be firmly but releasably held in engagement with the casing. Baffle plates 18 extend between the side walls of the hood and are firmly secured to the side walls but terminate in slightly spaced relation to the rear edges of the side walls, as shown in Fig. 3, so that these rear edge portions of the side walls may overlap the side walls of the casing when the hood is in place. Since the forward edges of the side walls of the casing bear against the rear edges of the baffles, a very firm connection between the hood and casing will be established when the securing nuts 17 are tightened. By referring to Fig. 2, it will be seen that the baffles may extend horizontally, and by referring to Fig. 4 it will be seen that the baffles may be disposed at an incline. A hood having horizontal baffles is used when the water gauge glass is at such an elevation that the engineer or other attendant must look upwardly in order to see it and the inclined baffles are used when the gauge glass is at about the level of a person's eyes.

When this device is in use, it is mounted upon a rod 5 or in any other desired manner at such a height and in such a position that when an engineer looks at a water gauge glass the gauge glass will be between the engineer and the illuminating device. By having the hood provided with baffles light will be permitted to pass outwardly from the shield to illuminate the gauge glass, but these shields will prevent the engineer from looking directly at the bulb. Therefore, the light from the bulb will not glare into the eyes of the engineer and prevent him from clearly seeing the water gauge. By an inspection of Fig. 2 it will be seen that when the water gauge glass is in an elevated position the engineer must look upwardly in the direction indicated by the arrow and, therefore, the baffles should extend horizontally so that the engineer will look at the under faces of the baffles and be prevented from seeing the bulb. When the water gauge glass is at about the height of a person standing upon the ground, the direction in which the engineer will look towards the gauge will be substantially horizontal, as indicated by the arrow in Fig. 4. Therefore, the baffles must be disposed at an incline so that the bulb will be hidden by the overlapping relation of the baffles to each other. If it is necessary to clean the baffles, the fasteners are released so that the hood may be removed after which the baffles may be thoroughly cleaned and the hood replaced. This will also permit the hood to be removed when a bulb has burned out and it is necessary to substitute a new one.

Having thus described the invention, I claim:

1. An illuminating device of the character described comprising a body open at its front and having side walls converging toward the open front of the body, illuminating means within said body, an extension for said body extending forwardly from the open front thereof and having side walls converging forwardly and having their rear edge portions overlapping the side walls of the body, baffle plates extending transversely through said extension in vertically spaced relation to each other, and means to releasably secure said extension to said body with side walls of the body bearing against the rear edges of the baffles.

2. An illuminating device of the character described comprising a body open at its front and having side walls converging toward the open front of the body, illuminating means within said body, an extension for said body extending forwardly from the open front thereof and having side walls converging forwardly and having their rear edge portions overlapping the side walls of the body, baffle plates extending transversely through said extension in vertically spaced relation to each other, cleats extending from opposite sides of said body, and bolts carried by said extension to extend through said cleats and having nuts to engage the cleats and draw the extension into engagement with the body with the side walls of the body wedged tightly between the side walls of the extension and bearing against rear edges of the baffles.

In testimony whereof I affix my signature.

HERBERT W. MORREALL. [L. S.]